United States Patent [19]
Thelen

[11] 3,779,580
[45] Dec. 18, 1973

[54] COMBINATION CAMPERSTEP, TIRE CARRIER AND TRAILER HITCH

[76] Inventor: Jerome P. Thelen, Rt. 3, Clark, S. Dak. 57225

[22] Filed: Mar. 3, 1972

[21] Appl. No.: 231,479

[52] U.S. Cl............................... 280/164, 224/42.06
[51] Int. Cl. ................................................ B60r 3/00
[58] Field of Search................... 280/163, 164, 166; 296/23 R; 224/42.01, 42.12, 42.06, 42.26

[56] References Cited
UNITED STATES PATENTS

| | | | |
|---|---|---|---|
| 3,613,971 | 10/1971 | Betz | 280/164 |
| 3,580,613 | 5/1971 | Northrop | 280/511 |
| 1,015,422 | 1/1912 | Campbell | 224/42.26 |
| 3,343,736 | 9/1967 | Sellers | 224/42.06 |
| 3,610,658 | 10/1971 | Sartori | 280/164 |

*Primary Examiner*—Robert R. Song
*Attorney*—Fred C. Philpitt

[57] ABSTRACT

Apparatus for mounting a spare tire on a vehicle, providing a step into the vehicle and towing another vehicle, in which, a bracket is attached to the rear of a vehicle, for example, to the bumper or frame, a tire carrier is pivotally mounted at its lower end to the bracket to permit it to swing from a generally-verticle position to a generally-horizontal position and has a generally flat step formed on its front side, a latch is provided on the bracket to releasably engage the tire carrier and hold it in its vertical position and a trailer hitch is attached to the bottom of the tire carrier, is pivotal with the tire carrier and protrudes beyond the rear of the tire carrier so that a towed vehicle may be coupled thereto.

7 Claims, 9 Drawing Figures

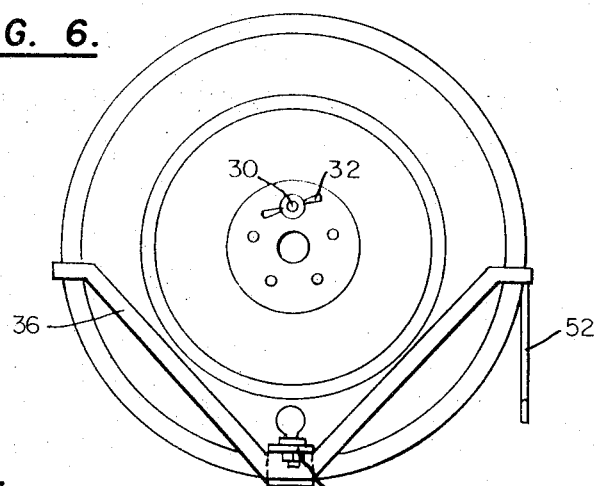
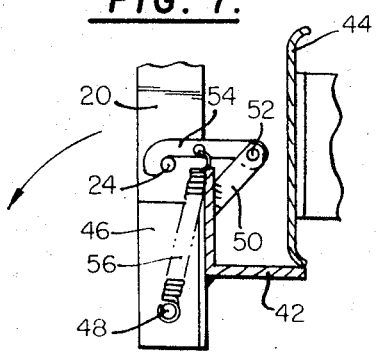
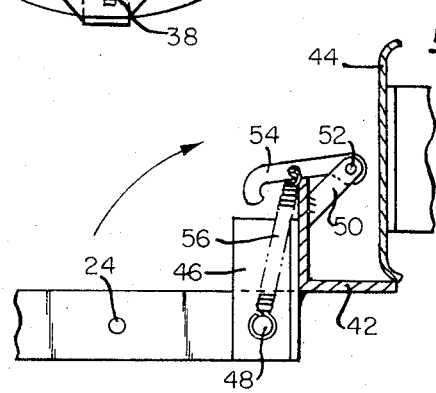
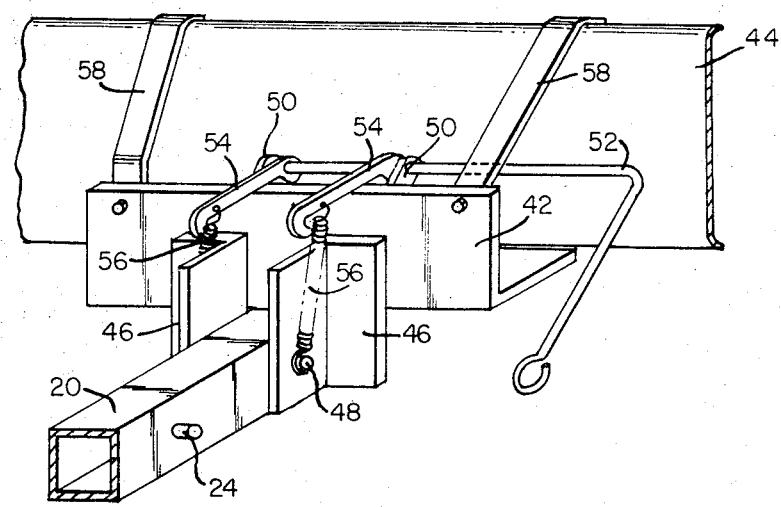

COMBINATION CAMPERSTEP, TIRE CARRIER AND TRAILER HITCH

BACKGROUND OF THE INVENTION

The present invention relates to a combination camper step, tire carrier and trailer hitch. In a more specific aspect, the present invention relates to a combination camper step, tire carrier and trailer hitch which is pivotally mounted on the rear of a towing vehicle and can be swung downwardly to a horizontal position to provide a step and a convenient entrance to a camper or trailer.

In the recreational vehicle field, a number of recreational vehicles, such as, trailers and campers which fit on the bed of a truck, are provided with rear access doors. This particular construction still makes it a problem to mount a spare tire in a place where it will be convenient and yet not interfere with the usefulness of a vehicle. Obviously, the spare tire cannot be mounted in the center of the rear of the vehicle as it normally would because of the location of the access door. Consequently, it is the usual practice to mount the spare tire on the body of the vehicle to the side of the door. Often, however, the door is sufficiently large that there is not adequate space on the rear body of the vehicle. This therefore requires mounting a tire on the side of the vehicle or on the top. In the first instance, the mounting of the spare tire increases the overall width of the vehicle and to the extent that it protrudes from the side of the vehicle, it becomes a hazard during the use of the vehicle. Accordingly, the only practical way of mounting a spare tire on the side of the vehicle is to mount it in a depression in the body of the vehicle. Obviously, mounting a spare tire on the top of the vehicle is a definite inconvenience.

Another problem in the use of recreational vehicles of the type referred to herein is that the distance from the ground to the floor of a vehicle is too great for a single stride of an individual and therefore, some means must be provided for an additional step to aid in entering the vehicle, particularly, in a truck-mounted camper. Obviously, the bumper of the truck or trailer can be used as an intermediate step for entering into the vehicle where a rear access door is provided. However, this is at best a makeshift or make do alternative since the bumper is usually rather narrow and there is always the chance of slipping and consequent injury, particularly, during wet or muddy weather.

It is also desirable in the use of recreational vehicles to be able to tow another unit or vehicle behind a recreational vehicle, particularly, a camper mounted on the bed of a truck. Quite often, the camper itself is relatively small and therefore, the user, in some instances, wishes to tow a conventional trailer, tent-type camper or the like. More frequently, however, it is desired to tow a boat trailer behind either a conventional trailer or truck-type camper. This creates still another problem in the utilization of recreational vehicles in that when the boat or other towed unit is uncoupled from the towing vehicle, the hitch of the towing vehicle protrudes rearwardly and becomes a source of aggravation. Obviously, the hitch must be mounted in the center of the vehicle and therefore, it is always in the path of a rear access door to the towing vehicle. Of course, such a conventional hitch is often used as a step in entering a rear access door of the recreational vehicle. This is even worse than utilizing the bumper of the vehicle and can be quite dangerous.

It is therefore an object of the present invention to overcome all of the above-mentioned deficiencies of the prior art. Yet another object of the present invention is to provide a combination tire carrier, access step and hitch for a recreational vehicle. Another and further object of the present invention is to provide a combination tire carrier, recreational vehicle step and hitch adapted to mount a spare tire in a convenient location, provide a sturdy and convenient hitch for a towed vehicle and a convenient step to an access door of a recreational vehicle, with the tire carrier and hitch conveniently disposed in an unobstructive position.

These and other objects and advantages of the present invention will be apparent from the following detailed description.

SUMMARY OF THE INVENTION

In accordance with the present invention, an apparatus is provided for mounting a spare tire on a vehicle, providing a step into the vehicle and towing another vehicle wherein bracket means is provided for attachment to the rear of the vehicle, a tire carrier is pivotally mounted at its lower end on the bracket to swing from a generally verticle position to a generally horizontal position and has a generally-flat step formed on its front side, a latch mechanism is provided to releasably engage the tire carrier and hold it in its vertical position and a hitch is fixedly attached to the tire carrier, is pivotable therewith and protrudes beyond the rear of the tire carrier for coupling a towed vehicle thereto.

BRIEF DESCRIPTION OF THE DRAWINGS

The objects and advantages of the present invention will be clear from the following description when read in conjunction with the drawings wherein;

FIG. 6 is a rear view of the apparatus of the present invention;

FIG. 7 is a side view partially in section showing details of the latch mechanism of the present invention;

FIG. 7a is a side view partially in section showing the latch mechanism of FIG. 7 when the apparatus is in its lowermost position; and FIG. 8 is a perspective view partially in section showing the bracket mechanism for attachment to a vehicle and the latch mechanism in detail.

DETAILED DESCRIPTION

Figure 1:
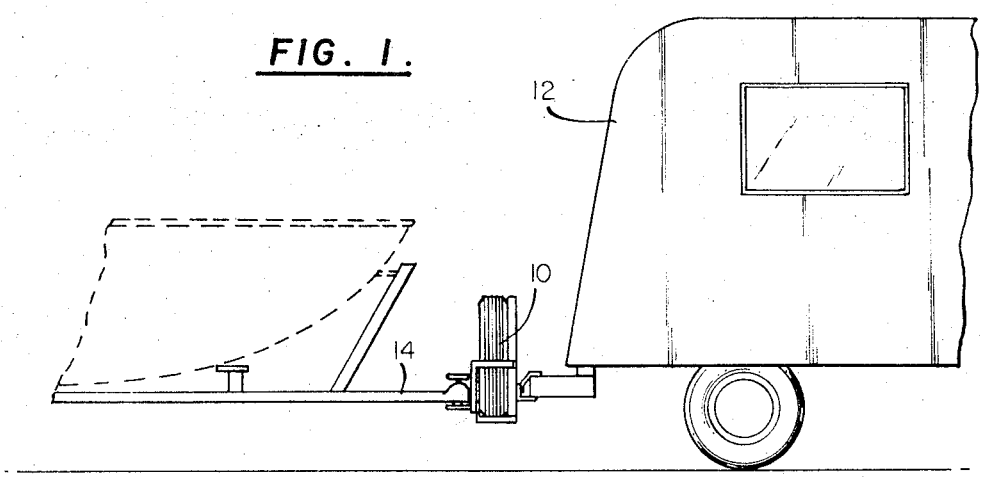
FIG. 1 is a side view partially in section showing the apparatus of the present invention in use for towing a boat by means of a recreational vehicle.

In accordance with FIG. 1 of the drawings, the combination tire carrier, camper step and trailer hitch 10 of the present invention is shown in use attached to a recreational vehicle 12 towing a boat and trailer 14.

In FIGS. 1 through 6, the apparatus of the present invention is shown in somewhat greater detail. The recreational vehicle access step 16 may be made of a variety of materials but is preferably a 16 gauge plate or expanded metal unit approximately 30 inches in diameter. Welded about the periphery of step 16 and on the rear side thereof is an outer step support or peripheral ring 18. Peripheral ring 18 is preferably made of three-sixteenth inch by 2 inch strap steel and is spot welded to step 16. Also welded to step 16 is dimetral, vertically-disposed main pedestal 20. Pedestal 20 is preferably made of 2 inch square structural steel tubing approximately 30 inches in length. Thus, main pedestal 20 extends slightly below the cutout section 22 of step 16. Pedestal 20 is drilled with a 5 inch diameter hole approximately 5 inches from its lower end through which latch pin 24 is mounted and preferably welded in position. Approximately 1 and ½ inches from the bottom of pedestal 20, the pedestal is drilled with a 1 inch diameter hole in which a three-quarter inch inside diameter tube 26 is inserted. Attached to the pedestal 20, slightly above its center and in a location such that it will pass through a bolt hole of the tire 28, is a nine-sixteenth inch by 6½ inch machine bolt 30 provided with a wing nut 32. Bolt 30 is attached to pillar 20 by means of side braces 34 and bottom brace 36, both made of three-sixteenth inch strap steel. Welded to either side of step support 18 and slightly below the center thereof is hitch support 36. Hitch support 36 is preferably made of five-eighth inch by 1 inch steel bar stock. Hitch support 36 extends outwardly from step support 18 a sufficient distance to accommodate the width of tire 28, then extends downwardly in a generally-V configuration at approximately a 45° angle and forms a flat portion at the base of the V to act as a hitch support. The flat portion at the base of hitch support 36 has a sufficient width that it will accommodate hitch member 38 and support the same within the V. Hitch member 38 is made of five-eighth inch by 2 ½ inch steel bar stock. One end thereof is drilled with a three-fourth inch diameter hole adapted to receive the bolt of a conventional hitch ball 40. The portion of hitch 38 carrying ball 40 is straight and extends outwardly beyond hitch support 36. The hitch element 38 then extends downwardly to provide an offset of approximately 2 inches and then extends toward and beneath pedestal 20. The hitch 38 is then welded to hitch support 36 and to the bottom of pedestal 20. It is clear from the drawings that the offset portion of the hitch 38, the hitch support 36 and the pedestal 20 all combine to form a support for the tire 28.

Figure 2:
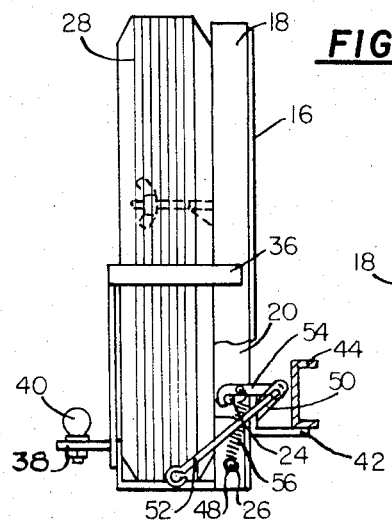
FIG. 2 is a side view partially in section of the apparatus of the present Application with the unit in its upright traveling position.
Figure 3:
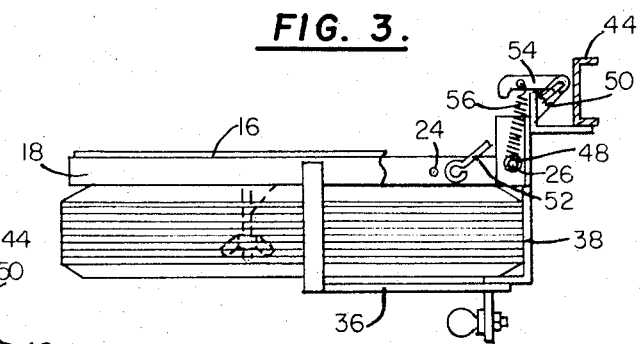
FIG. 3 is a side view partially in section of the apparatus of the present Application with the unit in its lowered position for use as a step.
Figure 4:
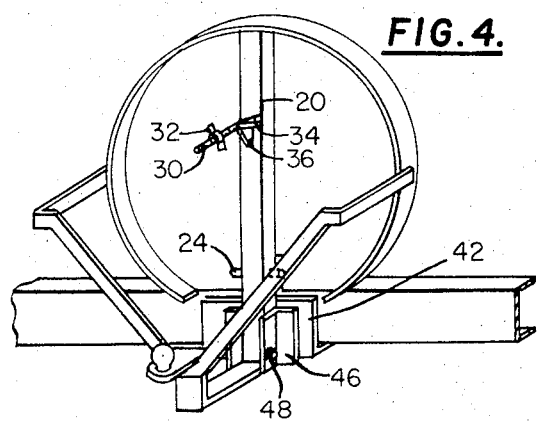
FIG. 4 is a front view partially in section showing the apparatus of the present invention in its lowermost position for use as a step.
Figure 5:
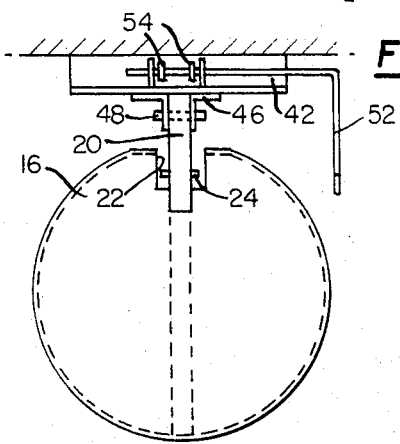
FIG. 5 is a rear perspective view of the apparatus of the present invention.

A main support bracket 42 is provided which is preferably made of one-fourth inch by 3 inch by 3 inch angle and is approximately 16 inches long. The main support bracket 42 is, of course, adapted to partially slide under a recreational vehicle bumper 44 for attachment to the bumper either by welding, bolting or other conventional means. Welded to the outside of main support bracket 42 and extending slightly below the main support bracket 42 are a pair of pedestal hinge brackets 46. Pedestal hinge brackets 46 are preferably made of one-fourth inch by 2 inch by 2 inch angle and are approximately 4 inches in length. Pedestal hinge brackets 46 are drilled approximately 1 inch from their lower end with a three-fourth inch diameter hole and are welded to main bracket 42 a sufficient distance apart to accommodate pedestal 20. Pivot pin 48 is then passed through pedestal hinge brackets 46 and sleeve 26 in pedestal 20 to thereby provide a pivot for the tire carrier-hitch unit so that this unit may be pivoted from its vertical position as shown in FIG. 2 to its horizontal position as shown in FIG. 3.

Mounted on the inside of main bracket 42 are spaced latch swivel brackets 50. Latch swivel brackets 50 are made of three-eighth inch steel plate and are drilled with a three-fourth inch diameter hole. Passing through the hole in swivel brackets 50 is latch release lever 52. Latch release lever 52 is generally-L shaped and is made of five-eighth inch diameter steel rod. Welded to latch release lever 52 are hook-shaped, spaced latch elements 54. Latch elements 54 are preferably made of three-eighth inch steel plate and drilled with a five-eighth inch diameter hole for the reception of latch release lever 52. As shown in FIG. 2 of the drawings, latch elements 54 hook over latch pin 24 mounted in pedestal 20. This latching, of course, releasably holds the tire carrier and hitch unit at its vertical position for highway travel. Latch elements 54 are held in the latched position by means of springs 56. Springs 56 are attached to pivot pin 48 and to latch elements 54, thus, holding the latch elements 54 in the latched position under normal circumstances. When it is desired to lower the tire carrier and hitch unit to the horizontal position as shown in FIG. 3 of the drawings, latch release lever 52 is raised to unhook latches 54 from latch pin 24, thereby releasing the tire carrier and hitch unit and permitting it to drop to the horizontal position. Accordingly, during normal highway use, the apparatus is attached to the bumper of a recreational vehicle or the like, the tire carrier and hitch unit are placed in their vertical position where the latches 54 engage latch pin 24 to hold the unit in its vertical traveling position. A boat or other towed unit can then be towed along by attachment to ball 40. When the desired destination is reached and the towed unit is uncoupled from ball and hitch 38–40, the latch release lever 52 is raised to unhook latches 54 from latch pin 24 and free the tire carrier and hitch unit for movement to the horizontal position. The unit is then lowered to its horizontal position where the tire carrier and the tire and the hitch are all out of the way where they will not obstruct access to a recreational vehicle. By the same token, step 16 provides a convenient access step to the rear door of a recreational vehicle or, for that matter, to the bed of a truck or other like vehicle.

FIGS. 7, 7a and 8 show in detail the latch mechanism of the present invention. FIG. 8 shows additional mounting brackets for attaching the unit to the bumper of a recreational vehicle or the like. These additional brackets include braces 58 which are bolted, welded or otherwise suitably attached to main bracket 42 near the top outer ends of the bracket and are then welded, bolted or otherwise attached the bumper 44 of the vehicle.

While the preferred embodiment has been described, it will be obvious to one skilled in the art that various modifications of the apparatus can be made without departing from the present invention. For example, it is known that a wide variety of techniques are utilized for the attachment of conventional hitches to a towing vehicle. In fact, in most cases, the attaching means and the means of attachment vary with the make of the towing vehicle. In some cases, attachment is made to the bumper only as indicated in the present Application, while in others, attachment is made to the frame of the towing vehicle, and the means of attachment may be bolting, welding or other known techniques. Consequently, any of a wide variety of brackets can be substituted for brackets 42 and 58 as shown in the present Application. It is also obvious that various means can be utilized to prevent the tire carrier and hitch unit from pivoting beyond the horizontal when it is lowered for use as a step. For example, a simple removable pin can be passed through pedestal 20 and the pedestal hinge brackets 46. Pedestal 20 can also be extended so that its inside surface contacts and rests against the bottom of bracket 42. The latch mechanism of the present Application can also be varied depending to a great extent upon the type of unit which is to be towed and other requirements of use. For example, a removable pin can be passed through pedestal 20 and the upper portion of pedestal hinge brackets 46 to hold the unit in its vertical position. Accordingly, it is to be understood that such obvious modifications will occur to one skilled in the art and therefore, the present invention is limited only by the apended Claims.

I claim:

1. Apparatus for mounting a spare tire on a vehicle, providing a step into the vehicle and towing another vehicle; comprising:
   a. bracket means for attachment to the rear of a vehicle;
   b. tire carrier means having its lower end pivotally attached to said bracket to swing from a generally vertical position to a generally-horizontal position and having a generally-flat step formed on its front side;
   c. latch means operatively associated with said tire carrier to releasably engage and hold said tire carrier in its vertical position;
   d. hitch means fixedly attached to said tire carrier means, privotable therewith and protruding beyond the rear of said tire carrier for coupling a towed vehicle thereto,
   e. said tire carrier including a bar type support extending rearwardly from the step portion of said tire carrier a distance sufficient to accommodate the thickness of a tire, thence runs downwardly in a generally V-configuration and terminates in a flat base, and
   f. wherein said hitch rests on top of the flat base portion of the V of the support.

2. Apparatus in accordance with claim 1 wherein the hitch rests on the flat base of the V of the support, is thence bent downwardly and then forwardly and is attached to the tire carrier adjacent its forward end.

3. Apparatus in accordance with claim 1 wherein a tubular pedestal is fixedly attached to the rear of the step portion of the tire carrier and extends diametrally downward and slightly beyond the bottom of said step portion.

4. Apparatus in accordance with claim 3 wherein the hitch is attached to the bottom of the pedestal.

5. Apparatus in accordance with claim 3 wherein a pin extends horizontally through the pedestal and is engaged by the latch.

6. Apparatus in accordance with claim 1 wherein a pin passes horizontally through the pedestal and the latch is a hook type latch which engages said pin.

7. Apparatus in accordance with claim 6 wherein the latch is spring biased into its latching position.

* * * * *